United States Patent
Deshpande et al.

(10) Patent No.: US 12,296,742 B2
(45) Date of Patent: *May 13, 2025

(54) VEHICLE LIGHT BRACKET ASSEMBLY

(71) Applicant: NISSAN NORTH AMERICA, INC., Franklin, TN (US)

(72) Inventors: Neelamkumar Deshpande, Novi, MI (US); Raghu Chervu, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,412

(22) Filed: May 10, 2024

(65) Prior Publication Data

US 2024/0359618 A1 Oct. 31, 2024

Related U.S. Application Data

(63) Continuation of application No. 18/309,666, filed on Apr. 28, 2023, now Pat. No. 12,005,831.

(51) Int. Cl.
*B60Q 1/04* (2006.01)
*B60Q 1/24* (2006.01)

(52) U.S. Cl.
CPC ............ *B60Q 1/0483* (2013.01); *B60Q 1/245* (2013.01)

(58) Field of Classification Search
CPC .............................. B60Q 1/245; B60Q 1/0483
See application file for complete search history.

(56) References Cited

U.S. PATENT DOCUMENTS

| 4,722,030 A | 1/1988 | Bowden |
| 4,928,216 A | 5/1990 | Carr |
| 5,481,441 A | 1/1996 | Stevens |
| D845,869 S | 4/2019 | Wymore |
| 2013/0077336 A1 | 3/2013 | Helterbrand et al. |
| 2013/0300556 A1* | 11/2013 | Wang ................... B60Q 1/2611 340/471 |
| 2018/0037152 A1 | 2/2018 | Wymore |

(Continued)

OTHER PUBLICATIONS

2021+ Ford Bronco Roof Rack Light Mount 40", https://gglights.com/products/2021-ford-bronco-roof-rack, Apr. 2023, GGLighting.

(Continued)

*Primary Examiner* — Alexander K Garlen
(74) *Attorney, Agent, or Firm* — Global IP Counselors, LLP

(57) ABSTRACT

A light bracket assembly includes a mounting bracket and a hollow member. The mounting bracket is configured to be connected to a sport bar of a vehicle. The mounting bracket includes an upper member, a lower member, and at least one support member. The lower member is configured to be connected to the sport bar. The least one support member extends between the upper member and the lower member. At least one opening is disposed in the upper member. Each of the at least one openings is configured to receive a light. The hollow member is configured to be connected to the mounting bracket. The hollow member substantially continuously surrounds the at least one support member.

18 Claims, 9 Drawing Sheets

(56) References Cited

U.S. PATENT DOCUMENTS

2018/0072244 A1 3/2018 Wymore
2019/0300347 A1 10/2019 Yoshioka et al.

OTHER PUBLICATIONS

KC M-rack kit-50" Pro6 Light Bar Roof Rack—Side Blackout Plates—19-21 Ford Ranger Supercrew, https://www.peaksuspension.com/products/kc-hilites-ford-ranger-45-gravity-pro6-roof-rack-system, Apr. 2023, Peak.

Baja Roof Rack and Lights installed, https://www.tacomaworld.com/threads/baja-roof-rack-and-lights-installed.274147/, Apr. 20, 2013, Tacoma World.

* cited by examiner

VEHICLE LIGHT BRACKET ASSEMBLY

CROSS-REFERENCE TO RELATED APPLICATIONS

This application is a continuation application of U.S. application Ser. No. 18/309,666, filed Apr. 28, 2023. The entire disclosure of U.S. application Ser. No. 18/309,666, filed Apr. 28, 2023, is hereby incorporated herein by reference.

BACKGROUND

Technical Field

The present disclosure generally relates to a light bracket assembly for a vehicle. More specifically, the present disclosure relates to a light bracket assembly configured to mount a light to a sport bar of a vehicle.

Background Information

A vehicle can be equipped with a sport, or roll, bar. A light, or an illumination assembly, can be mounted to the sport bar.

SUMMARY

An object of the present disclosure is to provide a light bracket assembly configured to mount a light to a sport bar of a vehicle.

In view of the state of the known technology, one aspect of the present disclosure is to provide a light bracket assembly including a mounting bracket and a hollow member. The mounting bracket is configured to be connected to a sport bar of a vehicle. The mounting bracket includes an upper member, a lower member, and at least one support member. The lower member is configured to be connected to the sport bar. The least one support member extends between the upper member and the lower member. At least one opening is disposed in the upper member. Each of the at least one openings is configured to receive a light. The hollow member is configured to be connected to the mounting bracket. The hollow member substantially continuously surrounds the at least one support member.

Another aspect of the present disclosure is to provide a sport bar assembly for a vehicle. The sport bar assembly includes an extruded member, a plurality of tubes, a light bracket assembly, and a light. The plurality of tubes extend between the extruded member and a vehicle body structure of the vehicle. The light bracket assembly includes a mounting bracket and a hollow member. The mounting bracket is connected to the extruded member. The mounting bracket includes an upper member, a lower member, and at least one support member. The lower member is connected to the extruded member. The least one support member extends between the upper member and the lower member. The hollow member is connected to the mounting bracket. The hollow member substantially continuously surrounds the at least one support member. The light is connected to the upper member of the mounting bracket of the light bracket assembly.

Also other objects, features, aspects and advantages of the disclosed vehicle light bracket assembly will become apparent to those skilled in the art from the following detailed description, which, taken in conjunction with the annexed drawings, discloses exemplary embodiments of the vehicle light bracket assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
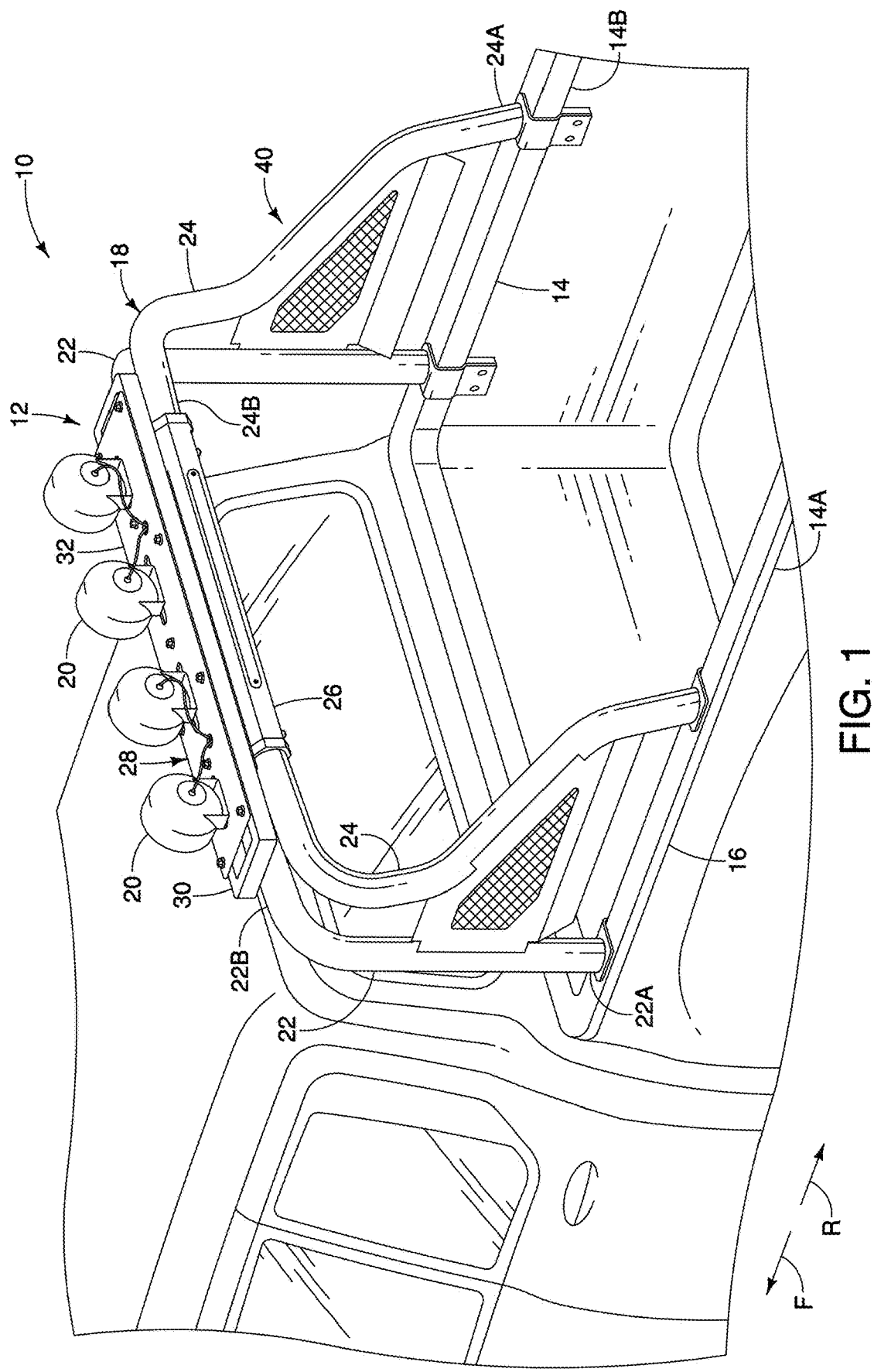
FIG. 1 is a perspective view of a light bracket assembly connected to a sport bar of a vehicle in accordance with an exemplary embodiment.

Referring initially to FIG. 1, a vehicle 10 is equipped with a light bracket assembly 12 in accordance with an exemplary embodiment. As shown, the vehicle 10 includes a truck bed, or cargo box, 14. The truck bed 14 is part of a vehicle body structure 16 of the vehicle 10. A sport, or roll, bar 18 is mounted to the truck bed 14 in any suitable manner. A plurality of lights, or an illumination assembly, 20 are mounted to the sport bar 18 by the light bracket assembly 12. Four lights 20 are illustrated as being mounted to the sport bar 18 by the light bracket assembly 12, although the light bracket assembly 12 can be configured to mount any desired number of lights to the sport bar 18. The vehicle 10 is illustrated as being a pick-up truck, although the vehicle 10 can be any vehicle to which the sport bar 18 can be mounted.

As shown in FIGS. 1-4, the sport bar 18 includes at least one forward tube, or bar, 22 and at least one rear tube, or bar, 24 connected to an extruded member 26. The at least one forward tube 22 preferably includes a pair of forward tubes 22 and the at least one rear tube 24 preferably includes a pair of rear tubes 24. The pair of forward tubes 22 are disposed forward of the pair of rear tubes 24 in a forward vehicle direction F. The forward tubes 22 and the rear tubes 24 are preferably hollow. Preferably, the forward tubes 22 and the rear tubes 24 are made of any suitable material, such as a black powder coated aluminum.

Figure 3:
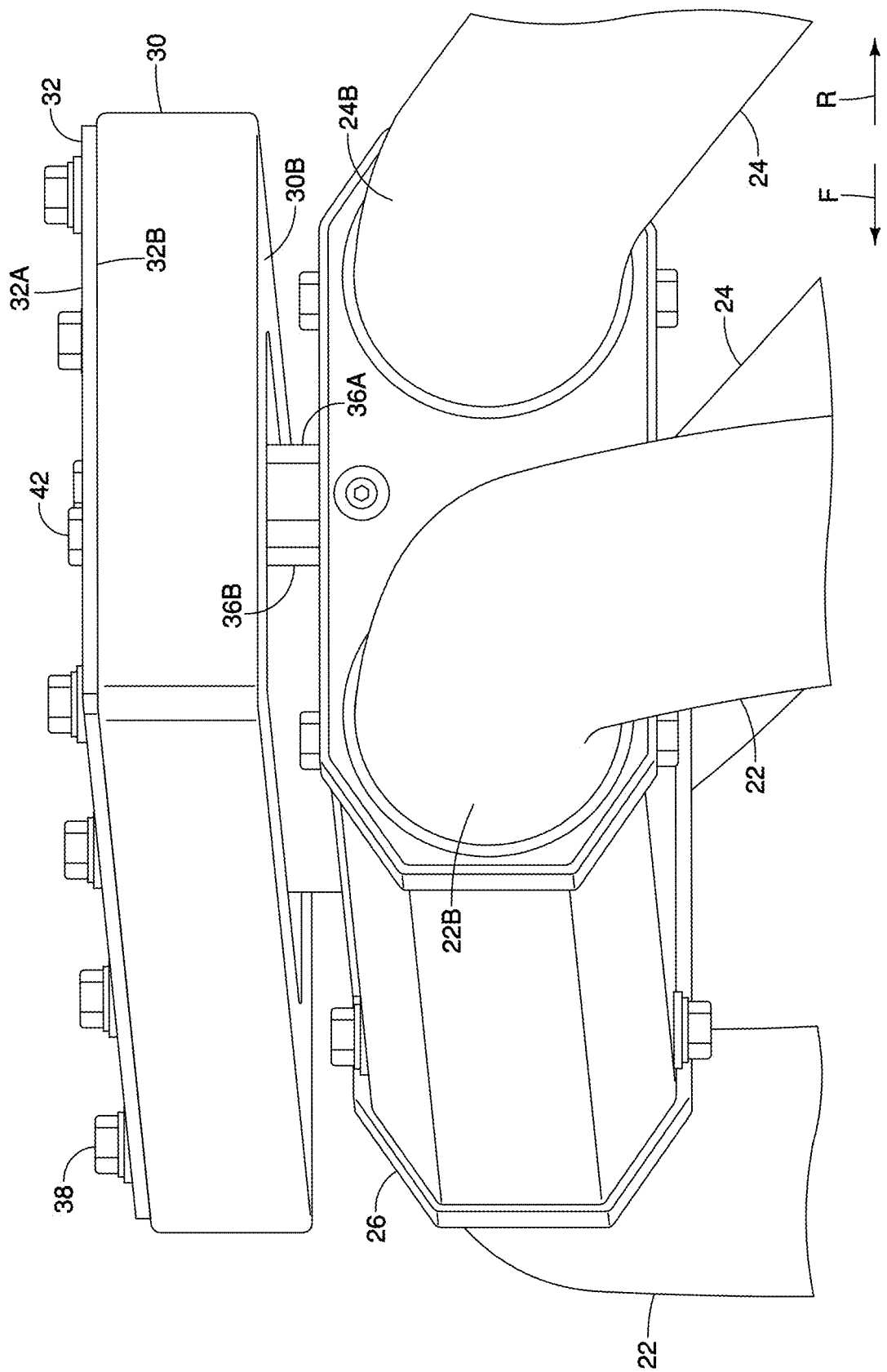
FIG. 3 is a perspective view of the light bracket assembly connected to the sport bar of FIG. 1.
Figure 4:
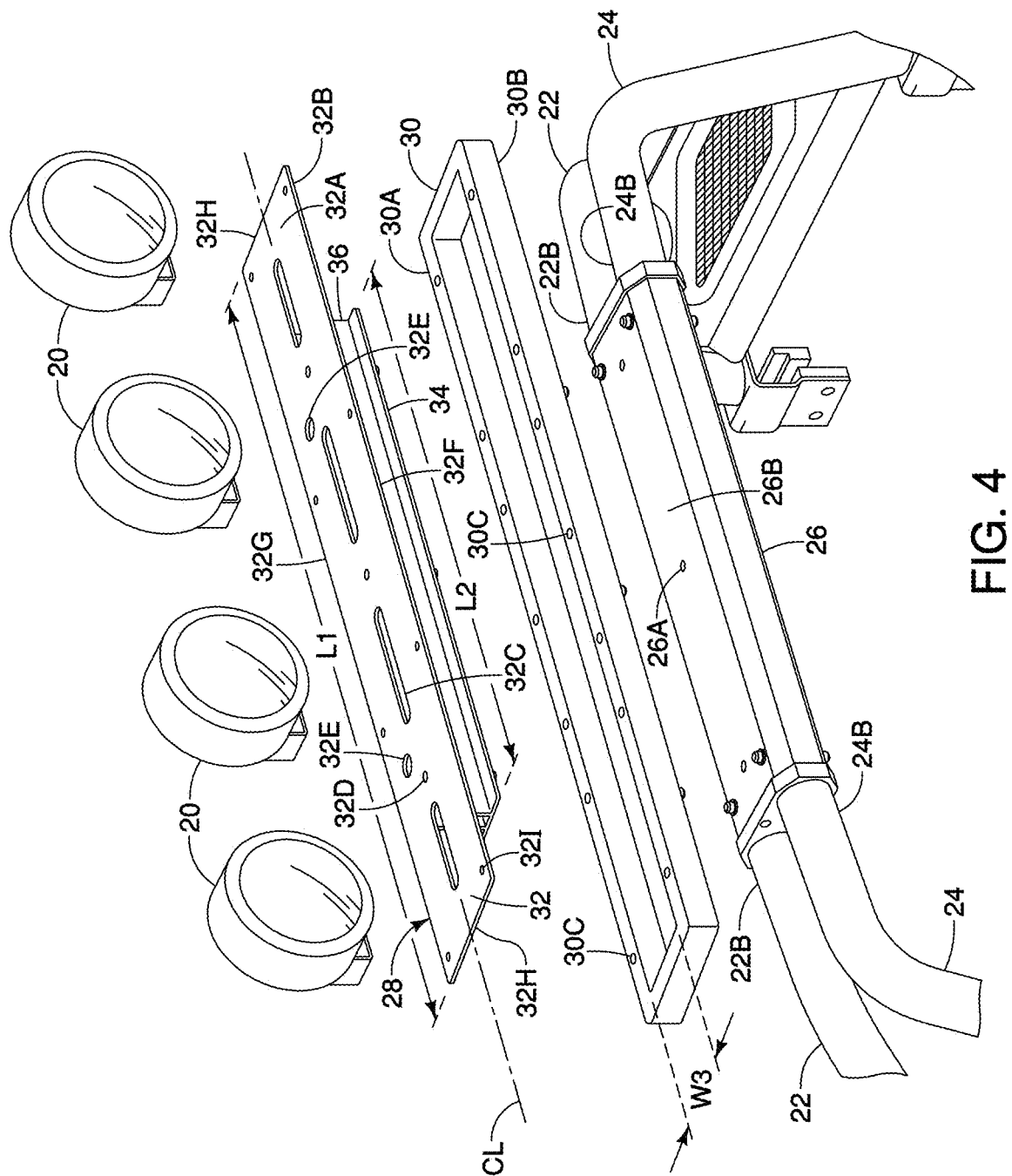
FIG. 4 is an exploded assembly view of the light bracket assembly of FIG. 1.

A first end 22A of each of the forward tubes 22 is connected to the truck bed 14, as shown in FIG. 1. The first ends 22A of the pair of forward tubes 22 are connected to the first and second sidewalls 14A and 14B of the truck bed 14, respectively. The first ends 22A of the pair of forward tubes 22A are preferably connected to the sidewalls 14A and 14B in any suitable manner, such as with brackets. A second end 22B of each of the forward tubes 22A is connected to the extruded member 26, as shown in FIGS. 3 and 4. The second ends 22B of the pair of forward tubes 22A are connected to the extruded member 26 in any suitable manner, such as by fasteners.

A first end 24A of each of the rear tubes 24 is connected to the truck bed 14, as shown in FIG. 1. The first ends 24A of the pair of rear tubes 24 are connected to the first and second sidewalls 14A and 14B of the truck bed 14, respectively. The first ends 24A of the pair of rear tubes 24A are preferably connected to the sidewalls 14A and 14B in any suitable manner, such as with brackets. A second end 24B of each of the rear tubes 24A is connected to the extruded member 26, as shown in FIGS. 3 and 4. The second ends 24B of the pair of rear tubes 24A are connected to the extruded member 26 in any suitable manner, such as by fasteners.

Figure 7:
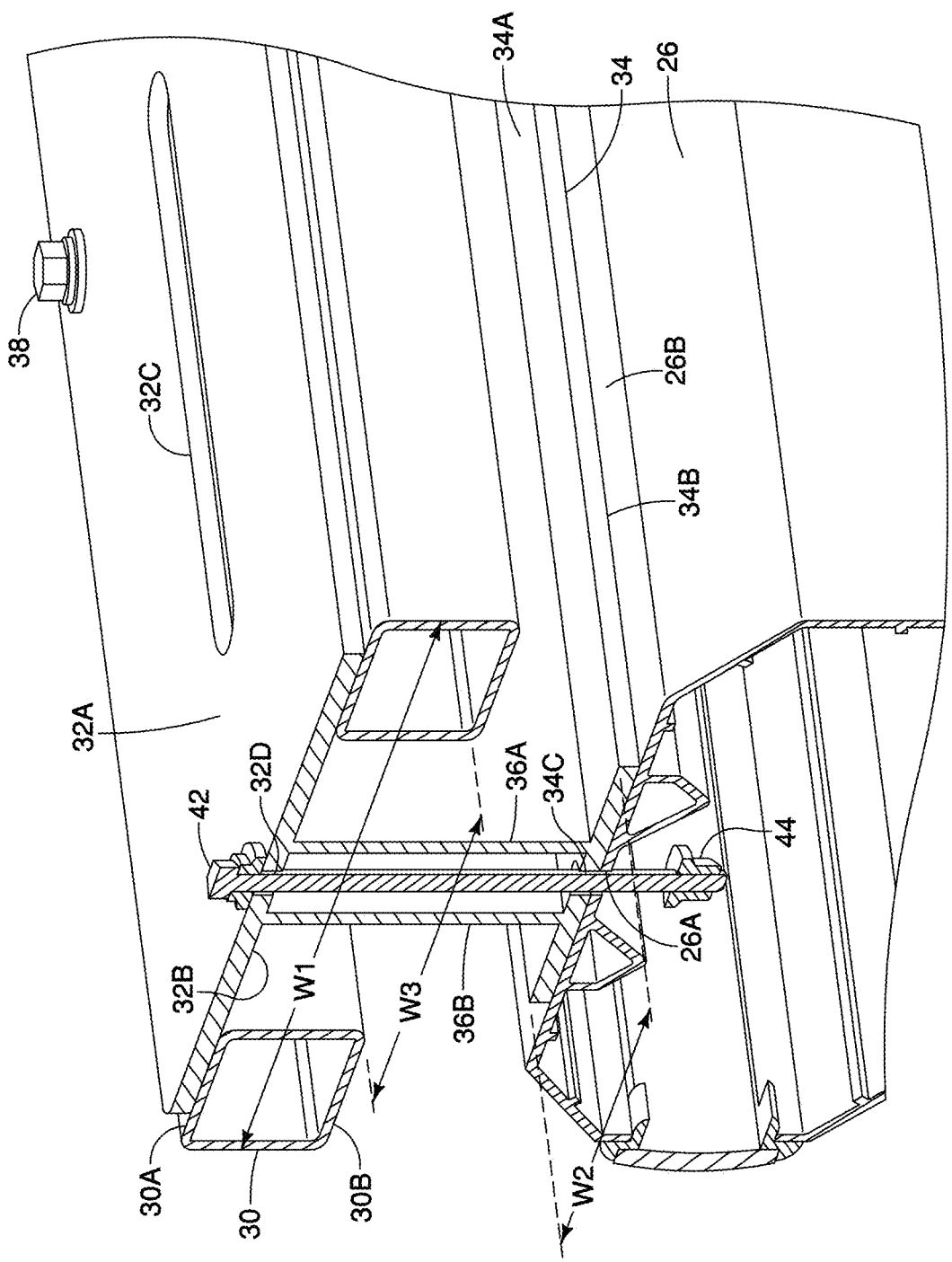
FIG. 7 is a perspective view in cross section of the light bracket assembly of FIG. 3 connected to the sport bar.

The extruded member 26 is configured to receive the second ends 22B and 24B of the forward tubes 22 and the rear tubes 24, as shown in FIGS. 1, 3 and 4. The plurality of tubes 22 and 24 extend between the extruded member 26 and the truck bed 14 of the vehicle body structure 16 of the vehicle 10. A plurality of fastener holes 26A are disposed in an upper surface 26B of the extruded member 26, as shown in FIGS. 4 and 7. The extruded member 26 is illustrated having three fastener holes 26A, although the extruded member can have any suitable number of fastener holes.

The light bracket assembly 12 is configured to be connected to the extruded member 26. The light bracket assembly 12 includes a mounting bracket 28 and a hollow member 30, as shown in FIGS. 1-9.

The mounting bracket 28 is configured to be connected to the extruded member 26 of the sport bar 18 of the vehicle 10, as shown in FIGS. 1-4 and 6-9. The mounting bracket 28 includes a substantially planar upper member 32 and a substantially planar lower member 34.

The substantially planar upper member 32 has an upper surface 32A and a lower surface 32B, as shown in FIGS. 3, 4, 6 and 7. At least one elongated slot 32C is formed in the upper member 32 of the mounting bracket 28. The elongated slot 32C extends from the upper surface 32A to the lower surface 32B of the upper member 32. Preferably, the upper member 32 of the mounting bracket 28 has a plurality of elongated slots 32C. As shown in FIG. 3, the upper member 32 of the mounting bracket 28 has four elongated slots 32C, although the upper member 32 of the mounting bracket 28 can have any suitable number of elongated slots 32C. Each elongated slot 32C is disposed on a longitudinal centerline CL of the upper member 32 of the mounting bracket 28. Each elongated slot 32C is preferably centered on the longitudinal centerline CL and extends in the longitudinal direction of the mounting bracket 28. Each elongated slot 32C is configured to receive a light 20.

Figure 5:
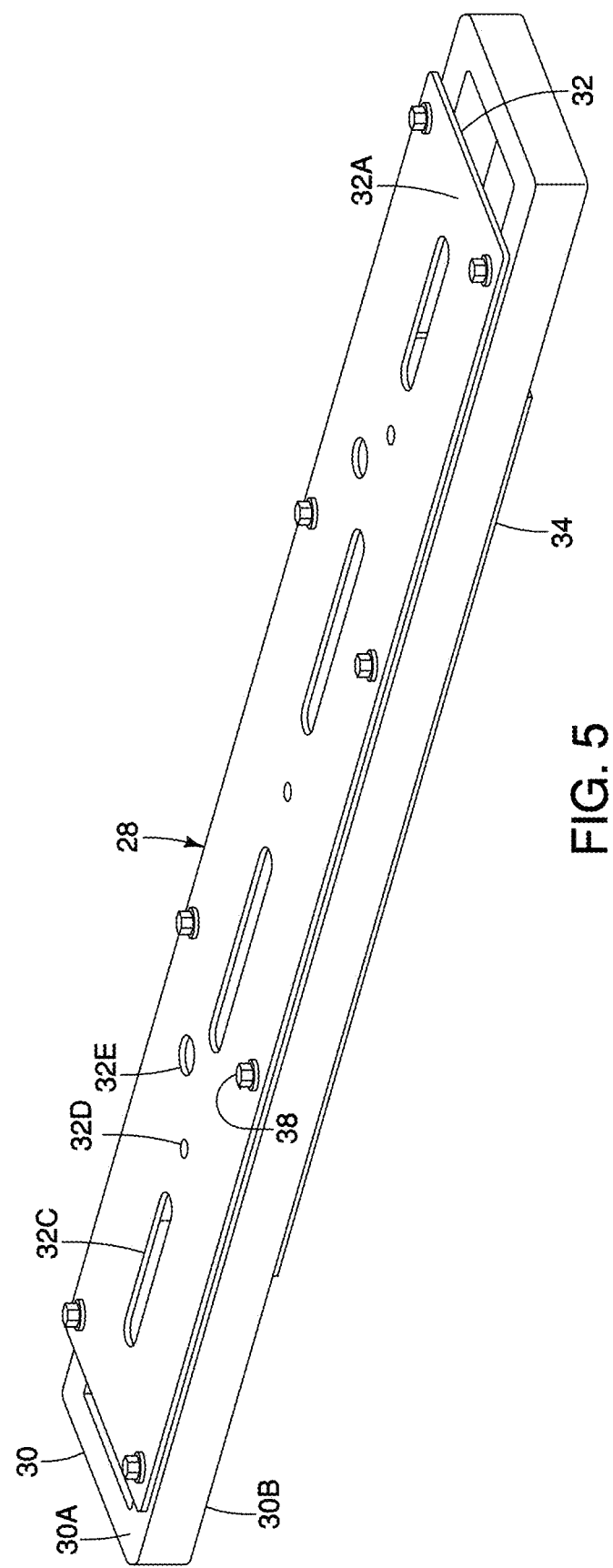
FIG. 5 is a perspective view of the light bracket assembly of FIG. 2.

At least one first fastener hole 32D is disposed in the upper member 32 of the mounting bracket 28, as shown in FIGS. 4 and 5. The first fastener hole 32D extends from the upper surface 32A to the lower surface 32B of the upper member 32. The upper member 32 of the mounting bracket 28 has three first fastener holes 32D, although the upper member 32 of the mounting bracket 28 can have any suitable number of first fastener holes 32D.

At least one wire opening 32E is disposed in the upper member 32 of the mounting bracket 28, as shown in FIGS. 2, 4, 5, 6, 8 and 9. The wire opening 32E extends from the upper surface 32A to the lower surface 32B of the upper member 32. The upper member 32 of the mounting bracket 28 has two wire openings 32E, although the mounting bracket 28 can have any suitable number of wire openings 32E. Each wire opening 32E is disposed in a forward vehicle direction F of the longitudinal centerline CL. Alternatively, each wire opening 32E can be disposed in a rearward vehicle direction R of the longitudinal centerline CL. Each of the plurality of wire openings 32E disposed in the upper member 32 of the mounting bracket 28 is configured to receive electrical wiring supplying power to the plurality of lights 20.

In the embodiment illustrated in FIG. 4, the mounting bracket 28 has four elongated slots 32C disposed in the upper member 32. One first fastener hole 32D is disposed between each adjacent pair of elongated slots 32C. Each of the three first fastener holes 32D is centered on the longitudinal centerline CL. One wire opening 32E is disposed between each separate pair of elongated slots 32C. A first wire opening 32E is disposed between a first pair of elongated slots 32C, and a second wire opening 32E is disposed between a second pair of elongated slots 32C. In other words, one wire opening 32E is disposed between the two leftmost elongated slots 32C, and another wire opening 32E is disposed between the two rightmost elongated slots 32C.

Figure 8:
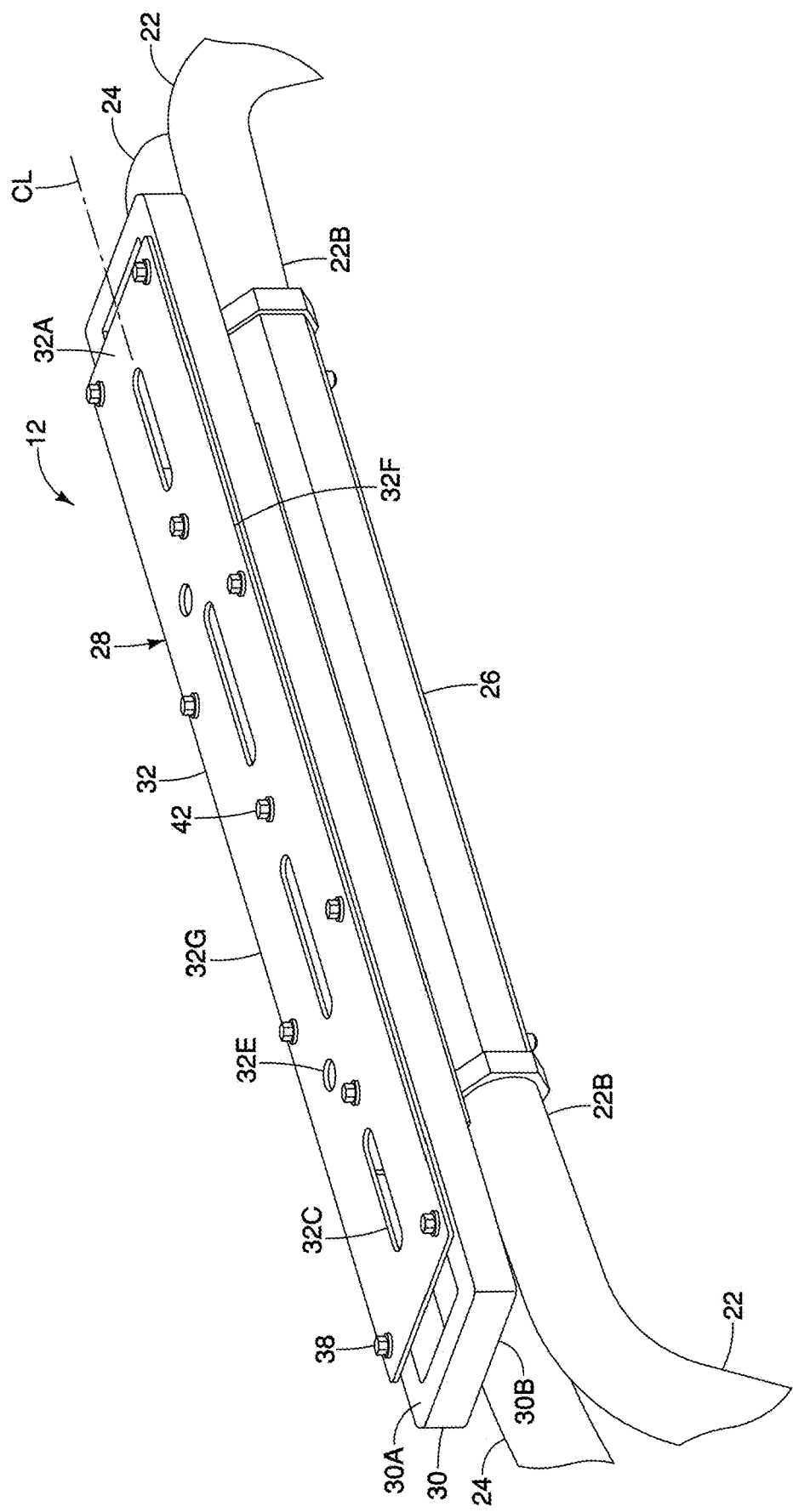
FIG. 8 is a perspective view of the light bracket assembly connected to the sport bar of FIG. 1.

The upper member 32 is preferably substantially rectangular, as shown in FIGS. 4 and 8. The upper member 32 has a forward edge 32F, a rear edge 32G, and side edges 32H. The rear edge 32G is substantially parallel to the forward edge 32F. The side edges 32H connect respective ends of the forward edge 32F and the rear edge 32G. The side edges 32H are preferably parallel to one another.

A plurality of second fastener holes 32I extend from the upper surface 32A to the lower surface 32B of the upper member 32, as shown in FIG. 4. The mounting bracket 28 can have any suitable number of second fastener holes 32I. As shown in FIG. 4, four second fastener holes 32I are disposed proximate the forward edge 32F of the upper member 32, and four second fastener holes 32I are disposed proximate the rear edge 32G of the upper member 32.

Each of the second fastener holes 32I disposed proximate the forward edge 32F of the upper member 32 is aligned in a longitudinal direction of the vehicle with one of the second fastener holes 32I disposed proximate the rear edge 32G of the upper member 32, as shown in FIG. 4. Preferably, an equal number of the second fastener holes 32I are disposed proximate the forward edge 32F of the upper member 32 as are disposed proximate the rear edge 32G of the upper member 32. Each of the second fastener holes 32I disposed in the upper member 32 of the mounting bracket 28 is configured to receive a fastener 38 to secure the hollow member 30 to the mounting bracket 28.

Figure 6:
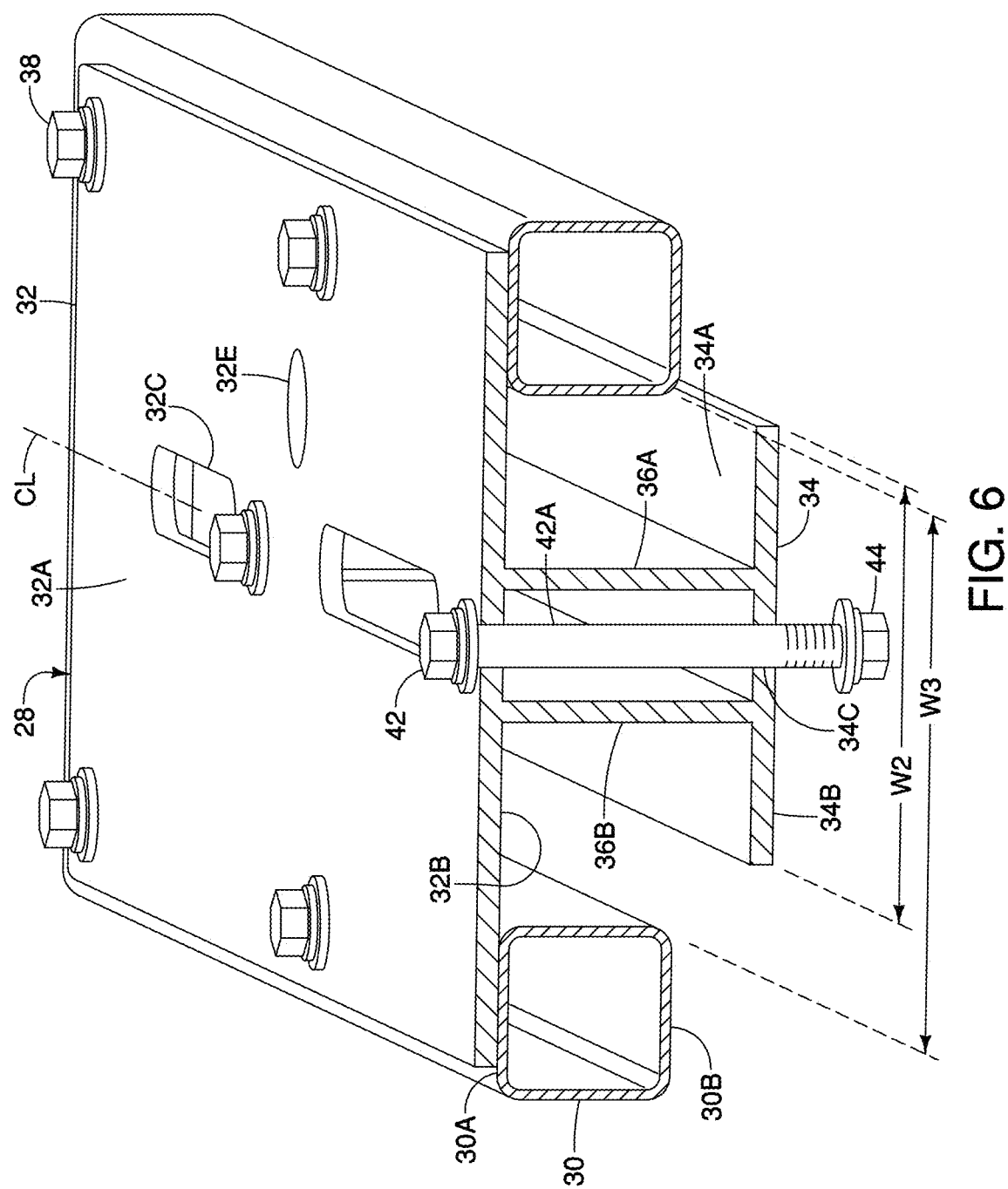
FIG. 6 is a perspective view in cross section of the light bracket assembly of FIG. 5.

The substantially planar lower member 34 has an upper surface 34A and a lower surface 34B, as shown in FIGS. 6 and 7. At least one fastener hole 34C is formed in the lower member 32 of the mounting bracket 28. The at least one fastener hole 34C extends from the super surface 34A to the lower surface 34B of the lower member 34. The number of fastener holes 34C in the lower member 34 is preferably equal to the number of first fastener holes 32D in the upper member 32. Each of the at least one fastener holes 34C is aligned with one of the at least one first fastener holes 32D in the upper member 32.

A length L1 of the upper member 32 is preferably greater than a length L2 of the lower member 34, as shown in FIG. 3. A width W1 of the upper member 32 is preferably greater than a width W2 of the lower member 34.

At least one support member 36 extends between the upper member 32 and the lower member 34 of the mounting bracket 28, as shown in FIGS. 3, 4, 6 and 7. The at least one support member 36 extends from a lower surface 32B of the upper member 32 to an upper surface 34A of the lower member 34. Preferably, a first support member 36A and a second support member 36B extend between the upper member 32 and the lower member 34. The first support member 36A and the second support member 36B are disposed on opposite sides of the longitudinal centerline CL of the upper member 32 of the mounting bracket 28. The first support member 36A is disposed in the vehicle forward direction F of the longitudinal centerline CL of the upper member 32 of the mounting bracket 28. The second support member 36B is disposed in the vehicle rearward direction R of the longitudinal centerline CL of the upper member 32 of the mounting bracket 28. The first support member 30A is spaced from the second support member 32 in the longitudinal direction of the vehicle.

The mounting bracket 28 is preferably made of any suitable material, such as aluminum. Preferably, the upper member 32, the lower member 34, and the at least one support member 36 of the mounting bracket 28 are unitarily formed as a one-piece, unitary member.

The hollow member 30 is configured to be connected to the mounting bracket 28, as shown in FIGS. 1-9. The hollow member 30 can have any suitable shape in cross-section, such as circular, elliptical or rectangular. The hollow member 30 extends continuously around the mounting bracket 28. In other words, the hollow member substantially surrounds the at least one support member 36. The hollow member 30 is preferably made of any suitable material, such as aluminum. The hollow member 30 is preferably formed as a one-piece, unitary member.

The hollow member 30 is disposed between the upper member 32 and the lower member 34 of the mounting bracket 28, as shown in FIGS. 5-7. An uppermost surface 30A of the hollow member 30 contacts the lower surface 32B of the upper member 32 of the mounting bracket 28 when the hollow member 30 is connected to the mounting bracket 28. A lowermost surface 30B of the hollow member 30 is spaced from the upper surface 34A of the lower member 34 of the mounting bracket 28.

The hollow member 30 is connected to the upper member 32 of the mounting bracket 28 by a plurality of fasteners 38 to form the light bracket assembly 12, as shown in FIG. 5. A width W3 between innermost surfaces of the hollow member on opposite sides of the first and second supports members 36A and 36B is greater than the width W2 of the lower member 34. The lower member 34 of the mounting bracket 28 is inserted within the opening defined by the hollow member 30 until the lower surface 32B of the upper member 32 contacts the uppermost surface 30A of the hollow member 34. A fastener 38 is inserted through each of the second fastener holes 32I in the upper member 32 of the mounting bracket 28 and into the hollow member 30. The hollow member 30 can have fastener holes 30C aligned with the fastener holes 32I in the upper member 30 as shown in FIG. 4, or self-tapping fasteners can be used. As shown in FIGS. 5 and 8, eight fasteners 38 connect the hollow member 30 to the upper member 32 of the mounting bracket 28. When the hollow member 30 is connected to the upper member 32 of the mounting bracket 28, the uppermost surface 30A of the hollow member 30 contacts the lower surface 32B of the upper member 32 of the mounting bracket 28 and a lowermost surface 30B of the hollow member is spaced from the upper surface 34A of the lower member 34.

Figure 2:
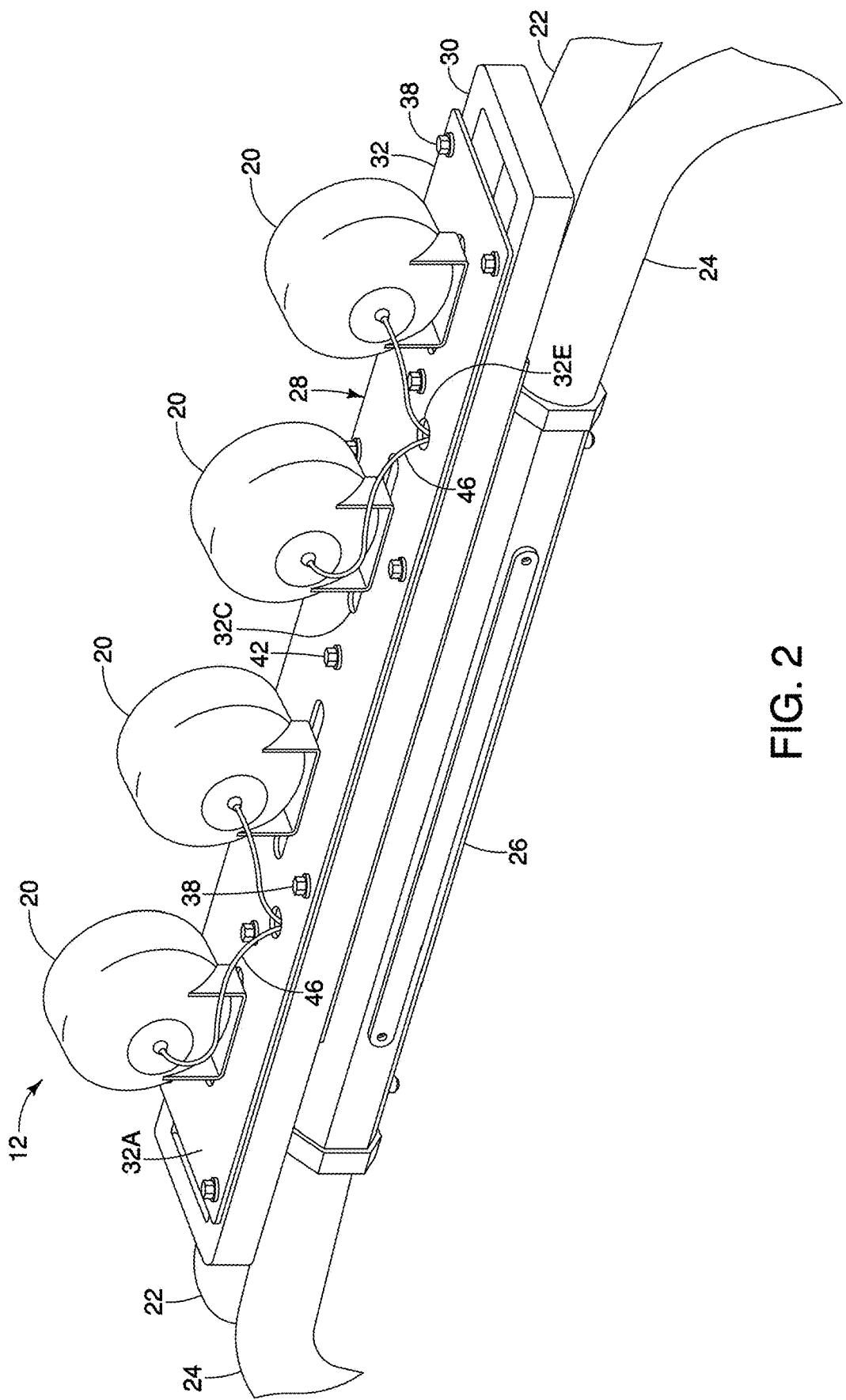
FIG. 2 is a perspective view of the light bracket assembly connected to the sport bar of FIG. 1 including a plurality of lights connected to the light bracket assembly.
Figure 9:
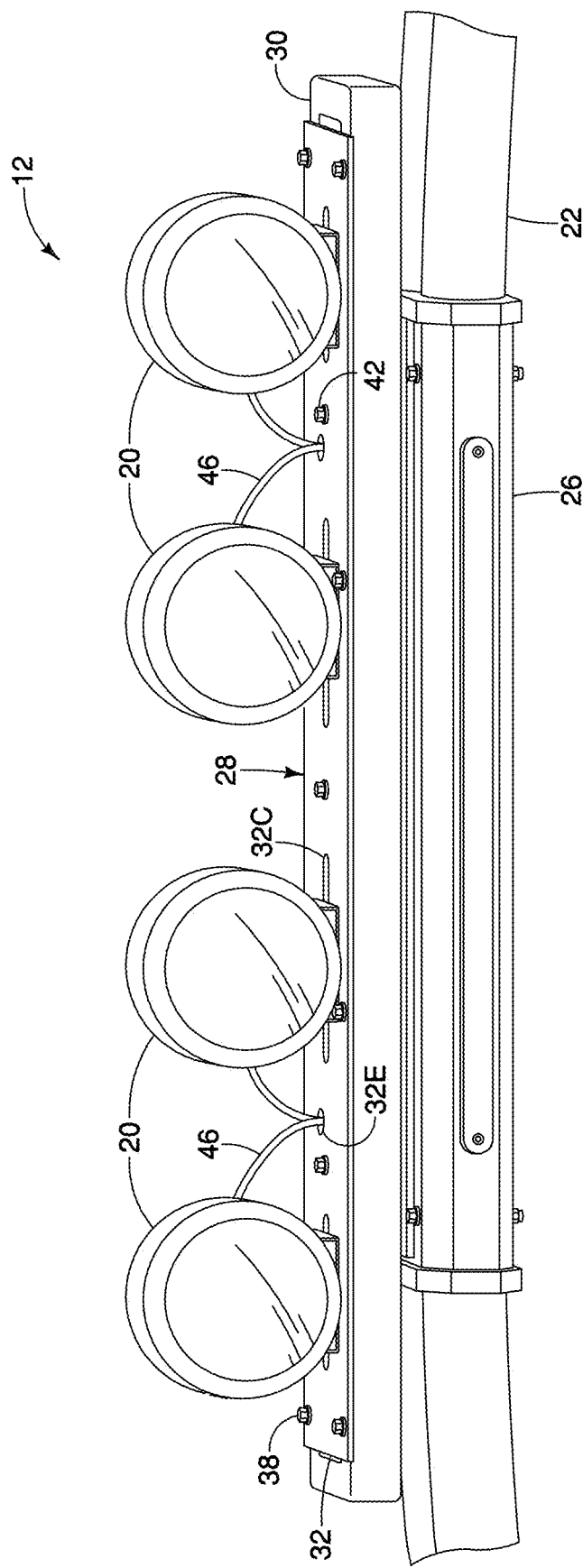
FIG. 9 is a perspective view of the light bracket assembly connected to the sport bar of FIG. 1 including a plurality of lights connected to the light bracket assembly.

The light bracket assembly 12 is then connected to the extruded member 26 of the sport bar assembly 40, as shown in FIGS. 1-4 and 7-9. A fastener 42 is inserted through each of the first fastener holes 32D in the upper member 32 of the mounting bracket 28 and through a corresponding opening 26A in the upper surface 26B of the extruded member 26. The fastener 42 extends from the upper member 32 of the mounting bracket 28 to the extruded member 26, as shown in FIG. 7. The fastener 42 extends from the upper member 32 between the first and second support members 36A and 36B, through an aligned opening in the lower member 34, and through an aligned opening 26A in the extruded member 26. A nut 44 can be disposed on a shaft 42A of the fastener 42 to tightly secure the mounting bracket 28 of the light bracket assembly 12 to the extruded member 26. As shown in FIGS. 2, 8 and 9, three fasteners 42 secure the mounting bracket 28 of the light bracket assembly 12 to the extruded member 26, although any suitable number of fasteners 42 can be used.

A light 20 is connected to the mounting bracket 28 of the light bracket assembly 12, as shown in FIGS. 1, 2, 4 and 9. The light 20 is connected to the upper member 32 of the mounting bracket 28 in any suitable manner. The light 20 is received by the elongated slot 32C, such that the light 20 can be moved along the elongated slot 32 to a desired position before securing the light 20 to the upper member 32. Electrical wiring 46 passes through wire opening 32E in the upper member to supply power to the light 20. The electrical wiring 46 extends into the extruded member 26 and is disposed in one of the tubes connected to the extruded member 26. The electrical wiring 46 is connected to a power source of the vehicle 10. The hollow member 30 facilitates preventing the electrical wiring 46 from being visible between the upper member 32 of the mounting bracket 28 and the extruded member 26.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle light bracket assembly. Accordingly, these terms, as utilized to describe the present invention should be interpreted relative to a vehicle equipped with the vehicle light bracket assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A light bracket assembly comprising:
   a mounting bracket configured to be connected to a sport bar of a vehicle, the mounting bracket including an upper member, a lower member configured to be connected to the sport bar, and at least one support member extending between the upper member and the lower member, at least one opening being disposed in the upper member, each of the at least one openings being configured to receive a light; and
   a hollow member configured to be connected to the mounting bracket, the hollow member substantially continuously surrounding the at least one support member, wherein a lowermost surface of the hollow member is spaced from an upper surface of the lower member.

2. The light bracket assembly according to claim 1, wherein
   the at least one support member includes a first support member and a second support member, the first and second support members being disposed on opposite sides of a longitudinal centerline of the upper member of the mounting bracket.

3. The light bracket assembly according to claim 2, wherein
   the upper member, the lower member and the at least one support member are unitarily formed as a one-piece member.

4. The light bracket assembly according to claim 1, wherein
   each of the at least one openings is disposed on a longitudinal centerline of the upper member of the mounting bracket.

5. The light bracket assembly according to claim 1, wherein
   an uppermost surface of the hollow member contacts a lower surface of the upper member of the mounting bracket.

6. The light bracket assembly according to claim 5, wherein
   each of a plurality of fastener holes disposed in the upper member of the mounting bracket is configured to receive a fastener to secure the hollow member to the mounting bracket.

7. The light bracket assembly according to claim 1, wherein
   a length of the upper member is greater than a length of the lower member.

8. The light bracket assembly according to claim 7, wherein
   a width of the upper member is greater than a width of the lower member.

9. The light bracket assembly according to claim 1, wherein
   a length of the hollow member is greater than a length of the lower member.

10. The light bracket assembly according to claim 9, wherein
    a width of the hollow member is greater than a width of the lower member.

11. The light bracket assembly according to claim 10, wherein
    a width between first and second innermost surfaces of the hollow member is greater than a width of the lower member, the first and second innermost surfaces being disposed on opposite sides of a longitudinal centerline of the upper member of the mounting bracket.

12. A sport bar assembly for a vehicle comprising:
    an extruded member;
    a plurality of tubes extending between the extruded member and a vehicle body structure of the vehicle;
    a light bracket assembly, the light bracket assembly including
       a mounting bracket connected to the extruded member, the mounting bracket including an upper member, a lower member connected to the extruded member, and at least one support member extending between the upper member and the lower member; and
       a hollow member connected to the mounting bracket, the hollow member substantially continuously surrounding the at least one support member, wherein a lowermost surface of the hollow member is spaced from an upper surface of the lower member; and
    a light connected to the upper member of the mounting bracket of the light bracket assembly.

13. The sport bar assembly according to claim 12, wherein the at least one support member includes a first support member and a second support member, the first and second support members being disposed on opposite sides of a longitudinal centerline of the upper member of the mounting bracket.

14. The sport bar assembly according to claim 13, wherein the upper member, the lower member and the at least one support member are unitarily formed as a one-piece member.

15. The sport bar assembly according to claim 12, wherein an uppermost surface of the hollow member contacts a lower surface of the upper member of the mounting bracket.

16. The sport bar assembly according to claim 12, wherein a length of the hollow member is greater than a length of the lower member.

17. The sport bar assembly according to claim 16, wherein a width of the hollow member is greater than a width of the lower member.

18. The sport bar assembly according to claim 12, wherein a wire opening is disposed in the upper member of the mounting bracket, the wire opening being offset from a longitudinal centerline of the upper member.

* * * * *